Figure 1:
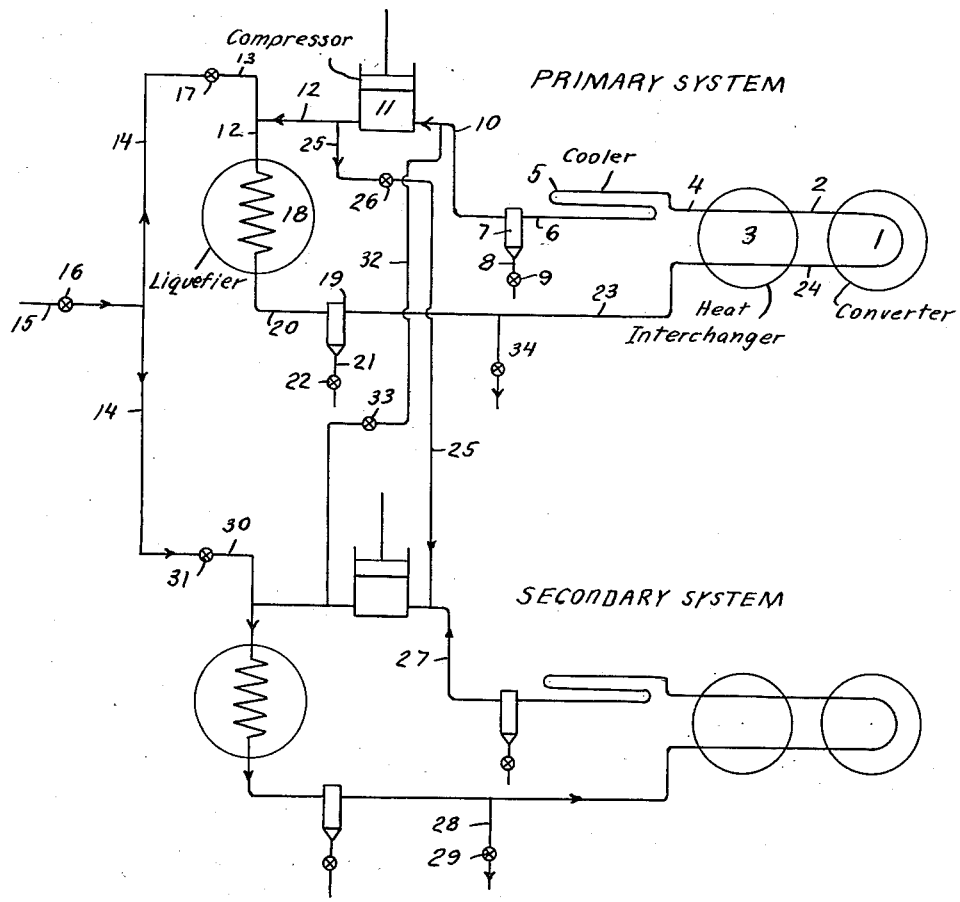

July 7, 1936.   J. J. O'LEARY   2,046,478
PROCESS AND APPARATUS FOR THE SYNTHESES OF COMPOUNDS
Filed Dec. 2, 1931   2 Sheets-Sheet 1

INVENTOR
John J. O'Leary
BY
ATTORNEY

July 7, 1936.                J. J. O'LEARY                2,046,478
          PROCESS AND APPARATUS FOR THE SYNTHESES OF COMPOUNDS
                     Filed Dec. 2, 1931        2 Sheets-Sheet 2

INVENTOR
John J. O'Leary
BY
ATTORNEY

Patented July 7, 1936

2,046,478

UNITED STATES PATENT OFFICE 2,046,478

PROCESS AND APPARATUS FOR THE SYNTHESES OF COMPOUNDS

John J. O'Leary, Prince George County, Va., assignor to Atmospheric Nitrogen Corporation, New York, N. Y., a corporation of New York Application December 2, 1931, Serial No. 578,484

14 Claims. (Cl. 23—199)

This invention relates to the synthetic production of compounds and especially to processes and apparatus in which a reaction mixture is treated in a recirculatory synthesis system. In particular, this invention relates to a process and apparatus for reacting materials containing inert substances such, for example, as the synthesis of ammonia by catalysis of a nitrogen-hydrogen gas mixture.

The synthesis of compounds involves reacting less complex materials in a manner such that a desired more complex product is obtained either by complete combination of the reactants or by a combination effected with the formation of by-products. In many instances, the reaction of the materials in a single treatment in contact with the catalyst is incomplete, in which cases it is generally desirable to recirculate the unreacted materials, preferably after removal of the product formed, into renewed contact with the catalyst in a recirculatory synthesis system thereby converting a substantially greater proportion of the reaction mixture into the desired product than corresponds to equilibrium conditions for contact of the reaction mixture with the catalyst. In order to maintain a continuity of operation, the material synthesized and removed as product is replaced by an equal amount of fresh reactants introduced into the system.

In employing a recirculatory process of the type described for the treatment of materials which contain inert compounds or which form by-products which are not removed from the circulating materials, the continued introduction of these inerts or by-products with the incoming fresh reactants or by formation in the system would result in a continual building up of the content of these undesirable constituents in the system and thus interfere with the progress of the desired synthesis reaction itself. In order to obviate this difficulty, it has heretofore been the practice to bleed from the recirculatory system, a portion of the material circulating therein to carry with it an amount of inerts or by-products equal to that introduced into the system either with the incoming fresh gas or by formation therein. The amount of withdrawn or bled material will depend upon the inert content of the fresh gas or the rate of formation of by-products and upon the amount of these materials practically permissible in the system.

It will be evident that the reaction mixture removed from the synthesis system represents an economic loss in that it contains reacting materials from which the desired product may be formed, which materials have usually been subjected to preliminary treatment to fit them for catalysis.

It is an object of this invention to provide a new process and apparatus which may readily be commercially employed for the economic and efficient synthetic production of compounds. It is an object of this invention to provide a process for the synthesis of compounds employing two synthesis systems comprising a primary and a secondary system in which the inert content of the primary system is maintained at a relatively low value by withdrawing a portion of the reaction mixture therefrom and introducing it into the secondary system. The inert content of the secondary system is maintained at a desired value by introducing fresh reaction mixture into this system and by bleeding therefrom a portion of the material circulating in the system. It is another object of this invention to provide an apparatus for the synthetic production of compounds comprising a plurality of circulatory synthesis units so connected that fresh make-up gas may be supplied to each unit and so interconnected that gas bled from any one or more of the units may be introduced into any desired one or more other units.

In its preferred embodiment, this invention has as an object the provision of a process for the synthesis of ammonia from a hydrogen-nitrogen mixture containing inerts whereby the production of ammonia is rendered relatively economical and the loss of uncombined nitrogen and hydrogen mixture, due to withdrawal or bleeding of reaction mixture to carry with it inerts from the system, is relatively small. Other objects of the invention will in part be obvious and will in part appear hereinafter.

I have discovered that the inert content (which term will be hereinafter employed to refer either to inert materials in a reaction mixture or to by-products formed in a synthesis system and which act to dilute the reaction materials and thus interfere with the progress of the synthesis) of a synthesis system may be practicably and economically controlled by employing a system comprising two synthesis systems; a primary and a secondary synthesis system both of which may preferably be recirculatory systems. The fresh reactants are introduced in parallel into both of the synthesis systems while a portion of the reaction mixture is withdrawn from the primary system to carry with it inerts and is introduced into the secondary system from which the final withdrawal of a portion of the reaction mixture is effected. The process of this invention, therefore, comprises the introduction of fresh reaction mixture into a plurality of synthesis systems in parallel and a withdrawal of reaction mixture from the systems in series. Where reference is made to primary and secondary systems it is, of course, intended to include operations where one or both of these systems are made up of a plurality of units operating in parallel or in series with respect to the flow of gases introduced into each system and the two systems operate in series with respect to the bleeding of gas therefrom.

Thus I have found that the synthetic production of compounds may be effectively accomplished from a reaction mixture containing inert material by introducing the mixture into both a primary and a secondary cyclic system and by withdrawing from the primary system a portion of the reaction mixture and introducing it into the secondary system. Employing this procedure, the inert materials are largely concentrated in the secondary system, the inert content of which may be regulated by the introduction of fresh reactants thereto and by bleeding therefrom and the inert content of the reaction mixture in the primary system may be maintained at a relatively low value by bleeding material from this system to the secondary system.

The process of this invention in which the reaction mixture containing inert material is withdrawn from a primary cyclic system and introduced into a secondary system and fresh reactants are introduced in parallel into both systems in predetermined amount whereby the inert content of the two systems may be independently controlled, may be utilized for the synthetic production of various products and especially those involving the catalysis of gaseous mixtures such as the production of ammonia from a mixture of hydrogen and nitrogen or of methanol from carbon monoxide and hydrogen. For a more complete understanding of the invention, it will be particularly described in its application to the production of ammonia from nitrogen-hydrogen gas containing inert material. Such an ammonia synthesis process may be carried out in the apparatus shown in the accompanying drawings which illustrate apparatus comprising a primary and a secondary system each of which in that of Fig. 1 comprises a single unit constituting a recirculatory gas system while in Figs. 2, 3, and 4 the primary systems each comprise a plurality of such units. The nitrogen-hydrogen gas is introduced in parallel into each of the units shown in the drawings and reaction mixture is withdrawn or bled from the primary and secondary systems in series.

In employing the apparatus shown in Fig. 1 for the synthesis of ammonia, in accordance with the process of this invention, a mixture of nitrogen and hydrogen in about the proportions of 1:3 and having an inert content which may be argon, methane and similar materials, is introduced into each of two recirculatory systems and in each system passes in contact with a catalyst at suitable temperature and pressure with separation of ammonia product from the gases between successive contacts with the catalyst. Each recirculatory system will, as is well known, include a means for circulating the nitrogen-hydrogen mixture, a catalyst chamber or converter containing a suitable catalyst and means for condensing or absorbing and removing the ammonia produced. Inasmuch as the two systems shown in the drawings are similarly constructed, it will be necessary only to describe one of the systems in detail since the various parts of the other system, if described, would be similarly indicated.

A mixture of nitrogen and hydrogen in the proportions by volume of about 1:3 are reacted in a converter or catalyst chamber 1 and the reaction mixture passed through a pipe 2 to a heat exchanger 3 in which it passes in heat exchange relation with the incoming gases, thus heating these gases prior to their introduction into the converter. From the heat exchanger, the gaseous mixture is conducted by a pipe 4 to a cooler 5 and thence by a pipe 6 to an ammonia separator 7 in which a portion of the ammonia separates as a liquid and may be withdrawn therefrom by a pipe 8 provided with a valve 9. The uncondensed reaction mixture is led by a pipe 10 to a compressor 11 which serves to circulate the gases in the system. To the gases passing from compressor 11 through a pipe 12, there is added a supply of fresh make-up gas introduced from a compressor, not shown, by means of a pipe 13 connected to a main 14, which is in turn connected to a supply pipe 15 having a valve 16. Pipe 13 is provided with a valve 17 for controlling the flow of fresh make-up gas into the primary system. The reaction mixture passing through pipe 12 to which fresh gases have been added is introduced into a liquefier 18. The cooled and partially liquefied gaseous mixture is conducted from the liquefier to a separator 19 by means of a connection 20. Ammonia in liquid form separates in the separator 19 and may be withdrawn therefrom by a pipe 21 having a valve 22. The material remaining in gaseous form is then conducted by a pipe 23 to heat exchanger 3 wherein its temperature is raised, and thence by a pipe 24 to converter 1, thus completing the cyclic process.

From the primary system a portion of the reaction mixture is withdrawn by means of a pipe 25 provided with a valve 26, and the thus withdrawn portion is introduced into the compressor intake pipe 27 of the secondary system. At this point, the withdrawn mixture mingles with the gaseous material being circulated in the secondary system and passes therethrough as a component part of such mixture. In order to prevent too great an accumulation of inert material in the secondary system, there is provided an outlet pipe 28 having a valve 29 which may be so regulated as to remove an amount of gaseous mixture, whereby the inert content may be held at the desired value. A pipe 30 provided with a valve 31 serves to conduct gas from main 14 into the secondary system. A pipe 32 provided with a valve 33 communicates between compressor intake pipe 10 of the primary system and the compressor outlet pipe of the secondary system. In operating in the manner described above valve 33 is closed. When it may be desired, however, to operate the aforesaid primary and secondary systems as secondary and primary systems respectively, valve 26 is closed and valve 33 opened, whereby a portion of the gas circulating in the aforesaid secondary system is passed into the primary system with an appropriate adjustment of the flows of fresh make-up gas to the two systems.

The synthesis of ammonia employing the apparatus shown in the drawings may be effected by preparing a nitrogen-hydrogen mixture in the proportions of 1:3 and purifying such mixture from oxides of carbon and/or other deleterious impurities. It is then led into both the primary and the secondary systems through pipes 13 and 30. The inert content in the primary system may be maintained at the desired pre-determined value by withdrawal of gas therefrom to the secondary system and the inert content of the secondary system controlled at the desired value by the introduction of fresh gas thereinto and by withdrawal of the desired amount of reaction mixture therefrom. It is preferred to withdraw gas from the primary system at a rate such that the inert content of the gas therein is maintained at about 3% and that of the secondary system at about 9%. In operating a primary system in conjunction with a secondary system of the same or smaller capacity, it will be apparent that in utilizing each system to its full capacity the amount of fresh gas supplied to the primary system will be greater than that supplied to the secondary system. The invention is not limited, however, to a process in which a greater amount of fresh gas is supplied to the primary system than to the secondary. An important advantage of the invention resides in its providing a means for independent control of the inert contents of the two systems, so that the secondary system may be operated with an inert content which is independent of the inert content of the primary system.

The synthesis process of this invention may be operated employing a catalyst of high activity in the secondary system wherein the inert content of the gases is relatively high, and a catalyst of lower activity, as for example a catalyst which has decreased in activity through use, in the primary system wherein the gases contain a lower proportion of inerts. By thus operating the two systems, with the catalysts of differing catalytic activity, the low inert content of the primary system favors the synthesis reaction in the presence of the catalyst of lower activity, while in the secondary system the higher inert content serves to facilitate a control of the temperature of the catalyst of higher activity and thus prolong the period of its high activity. My invention, accordingly, provides a process and apparatus wherein a plurality of cyclic synthesis systems may be operated with changes in the course of the gas flows through the systems as a whole in accordance with the changing activities of the catalysts.

Figure 2:
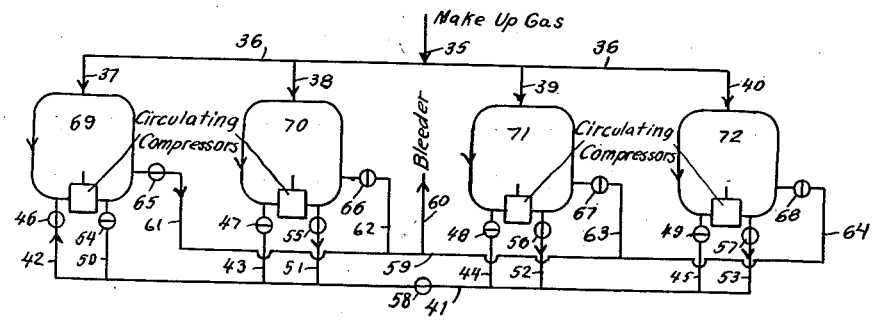
Figure 3:
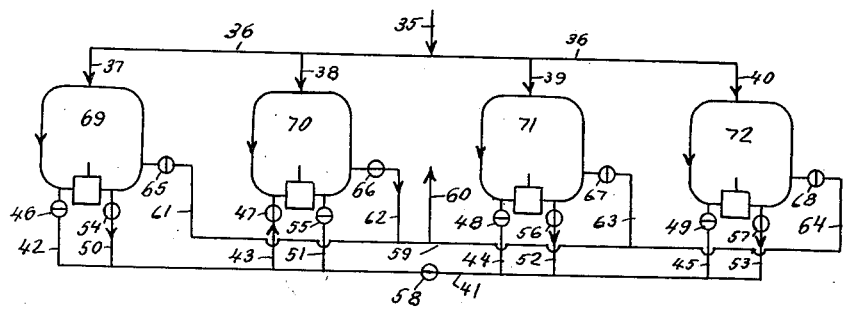
Figure 4:
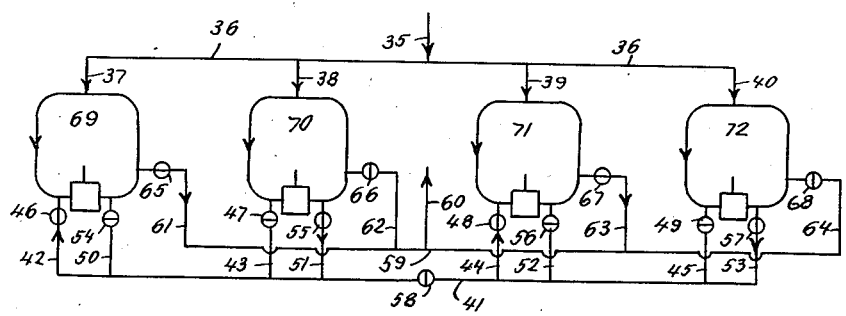

Figs. 2, 3, and 4 diagrammatically illustrate a synthesis system suitable for use in carrying out the process of this invention each of which comprises four recirculatory systems. In the apparatus of drawings 2, 3 and 4, a system of interconnecting pipes is provided for the several circulatory systems whereby any two or three of the systems may be operated in parallel with respect to make-up gas and bleed from the systems to any one or two of the systems which may be operated in series with respect to the gas bled from the other systems and in parallel with the supply of fresh make-up gas thereto.

With particular reference to Fig. 2, the numerals 69, 70, 71, and 72 indicate four recirculatory synthesis units, each of which includes the apparatus features indicated for the primary system of Fig. 1 which, for the sake of simplicity, have been in part omitted from Fig. 2 as well as from Figs. 3 and 4. A make-up gas supply pipe 35 and main 36 are connected with the recirculatory synthesis units by means of pipes 37, 38, 39, and 40. A gas main 41 is connected with the intake pipes of the circulating compressors of the synthesis units by means of pipes 42, 43, 44, and 45 provided with valves 46, 47, 48, and 49 respectively. Gas main 41 also communicates with the compressor outlet pipe of the synthesis systems by means of pipes 50, 51, 52, and 53 provided with valves 54, 55, 56, and 57 respectively. A valve 58 is positioned in main 41 intermediate between its connections with pipes 51 and 44. A bleeder gas main 59 venting through a pipe 60 communicates with the recirculatory synthesis systems by means of pipes 61, 62, 63, and 64 provided with valves 65, 66, 67, and 68 respectively.

In operating synthesis unit 69 with a fresh highly active catalyst and units 70, 71, and 72 with a catalyst of relatively lower activity, valves 46, 65, 55, 58, 56, and 57 are open and valves 54, 47, 66, 48, 67, 49, and 68 are closed. Units 70, 71, and 72 then form a primary synthesis system to which fresh make-up gas is supplied from main 36 through pipes 38, 39, and 40 and from which gas recirculating in the units is bled to main 41, through pipes 51, 52, and 53 and passed into a secondary synthesis system comprising unit 69, which likewise receives a supply of fresh make-up gas from main 36 through pipe 37. A portion of the recirculating gas is bled from unit 69 through pipe 61 to main 59 and thence vented through pipe 60. It will thus be seen that the primary system comprising units 70, 71, and 72 and the secondary system comprising unit 69, operate in parallel with respect to supply of make-up gas from main 36 and in series with respect to bleed of gas from the primary system to the secondary system and thence to main 59.

The apparatus of Figs. 3 and 4 is the same as that shown in Fig. 2, but Fig. 3 illustrates the setting of the valves of the apparatus when units 69, 71, and 72 operate as a primary synthesis system and unit 70 operates as a secondary system, with parallel supply of fresh make-up gas to both systems and series withdrawal therefrom of bleeder gas. In thus operating the apparatus of Fig. 3, vavles 54, 47, 66, 56, 57, and 58 are open and valves 46, 65, 55, 48, 67, 49, and 68 are closed. Gas from units 69, 71, and 72 thus passes through pipes 50, 52, and 53 to main 41 and thence through pipe 43 into unit 70. Gas is bled from unit 70 through pipe 62 to main 59 and all of the units receive supplies of fresh make-up gas from main 36 through pipes 37, 38, 39, and 40. Fig. 4 shows the apparatus of Fig. 2 with the valves set for operation of units 70 and 72 as primary systems and units 69 and 71 as secondary systems. Valves 46, 65, 55, 48, 67, and 57 are open and valves 54, 47, 66, 56, 49, 68, and 58 are closed. Fresh make-up gas is supplied in parallel to each of the units from main 36 through pipes 37, 38, 39, and 40. Gas is bled from units 70 and 72 through pipes 51 and 57 to main 41 and thence conducted in parallel through pipes 42 and 44 into units 69 and 71 respectively. Gas is bled from units 69 and 71 through pipes 61 and 63 to main 59 and thence discharged through pipe 60.

As is shown in Figs. 2, 3, and 4, each of a plurality of circulatory synthesis units is provided with gas inlet and outlet conduits. The outlet conduit of each unit intercommunicates through a gas main with the inlet conduit of each of the other units. In addition each unit is associated with an inlet gas conduit for introducing a supply of fresh make-up gas. The efficient operation of a synthesis system of this design may be readily carried out by supplying fresh gas in parallel to all of the units and bleeding a portion of the gas circulating in one or more of the units into one or more of the units which contains a catalyst material of high efficiency. When the relative activities of the catalysts in the several units are different, the course of the gases through the system may be arranged always to bleed into a unit containing the more active catalyst from a unit containing a catalyst of lower activity. By providing in the apparatus shown in Fig. 1, a second interconnecting gas pipe 32 with valve 33 similar to pipe 25 but communicating between compressor intake pipe 10 of the primary system and compressor outlet pipe 12 of the secondary system and an outlet pipe 34 leading from pipe 23 of the primary system similar to outlet pipe 28 of the secondary system, it is likewise possible to operate either of the two gas circulatory units shown in Fig. 1 as the primary or as the secondary system according to the catalytic activity of the catalysts in the two units. In this apparatus, the single pipes 25 and 32 each constitutes a gas inlet and a gas outlet conduit and, as in the case of the apparatus of Figs. 2, 3, and 4, the gas outlet of one unit intercommunicates with the gas inlet conduit of the other unit.

It will be understood, of course, that the process of this invention is not limited to the introduction of the reacting gases or to the withdrawal of reaction mixture at the points hereinbefore mentioned, but that such introduction and withdrawal may be accomplished at other points without materially affecting the efficiency of the operation. In the particular apparatus shown in the drawings, separate gas inlet and gas outlet pipes are provided for each circulatory system communicating with the inlet and outlet pumps respectively of the circulatory pumps. It is apparent to one skilled in the art that these may be combined as a single pipe connection and provision made for the positive withdrawal or introduction of the gases from or into each of the circulatory systems. Where the synthesis is carried out under relatively high pressures, the pressures in the two systems may be substantially the same or either system may be operated at a materially greater or lower pressure than the other, in which case it is apparent means for attaining these different pressures in the two systems may be added to the particular apparatus illustrated and described above. If it is desired, the residual gas withdrawn from the secondary system may be treated to remove the hydrogen content thereof and then subjected to a process for the extraction thereof of the rare gases such as argon and helium. Accordingly, since certain changes may be made in carrying out the above process without departing from the scope of the invention, it is intended that all matter contained in the above description shall be interpreted as illustrative and not in a limiting sense.

I claim:

1. In combination in an apparatus for the synthesis of ammonia, a plurality of circulatory synthesis units each comprising a gas circulatory compressor, a gas main, gas inlet connections communicating between said gas main and each of the synthesis units, a second gas main, gas inlet connections communicating between said second gas main and the circulator compressor intake pipe of each of the aforesaid synthesis units, gas exit connections communicating between said second main and the circulatory compressor gas outlet of each of the aforesaid synthesis units, gas bleeding pipes communicating with each of the synthesis units, and valves positioned in each of the aforesaid gas inlet pipes, gas outlet pipes and gas bleeding pipes.

2. A process for the synthetic production of compounds which comprises introducing a reaction mixture into a plurality of synthesis systems in parallel, passing the reaction mixture in said systems together with inert material in contact with catalysts of differing catalytic activity, and withdrawing a portion of the reaction mixture from a synthesis system containing catalyst of relatively lower activity and introducing the withdrawn mixture into a synthesis system containing catalyst of relatively higher activity.

3. A process for the synthesis of ammonia which comprises treating a nitrogen-hydrogen gas containing inerts in a recirculatory gas system wherein the gas is recirculated into contact with an ammonia synthesis catalyst, bleeding from said system a portion of the gas circulating therein, introducing the bled gas into a second ammonia synthesis system wherein the gas is contacted with an ammonia synthesis catalyst of higher catalytic activity than the catalyst in the aforesaid system, and introducing fresh nitrogen-hydrogen gas into both of the said synthesis systems.

4. The process for the synthetic production of ammonia which comprises introducing nitrogen-hydrogen gas containing inerts into a plurality of circulatory gas systems wherein said gas is recirculated into contact with catalysts of differing catalytic activity for the synthesis of ammonia therefrom, withdrawing a portion of the gas circulating in a system containing catalyst of relatively lower activity and introducing the withdrawn gas into another of the systems containing catalyst of relatively higher activity and proportioning the amounts of gases introduced into and withdrawn from said systems to maintain a higher inert content of the gas in the last mentioned system than in the systems from which gas is introduced thereinto.

5. A process for the synthetic production of compounds which comprises circulating material in a circulatory synthesis system in which the material is passed in that system through a synthesis step and then through a product-removal step, withdrawing from said system a portion of the reaction mixture circulated therein, introducing said withdrawn portion into another synthesis system, passing said portion of reaction mixture in the last mentioned system through a synthesis step and then through a product-removal step separate from the circulation of material in the first mentioned system through the synthesis step and then through the product-removal step and separately introducing fresh reactants accompanied by inert material into each of said systems.

6. A process for the synthetic production of compounds which comprises circulating material in each of a plurality of circulatory synthesis systems in which the material circulating in each system is passed in that system through a synthesis step and then through a product-removal step separate from the circulation of material in another of said systems through a synthesis step and then through a product-removal step, separately introducing fresh reactants accompanied by inert material into each of said systems, withdrawing from one of said systems a portion of the reaction mixture circulated therein and introducing said withdrawn portion into another of said systems.

7. A process for the synthetic production of compounds which comprises circulating a gaseous mixture of reactants in each of a plurality of gas circulatory systems in which the gaseous mixture circulating in each system is passed in that system through a synthesis step and then through a product-removal step separate from the circulation of the gaseous mixture in another of said systems through a synthesis step and then through a product-removal step, separately introducing fresh reactants accompanied by inert material into each of said systems, withdrawing from one of said systems a portion of the reaction mixture circulated therein, introducing said withdrawn portion into another of said systems, bleeding reaction mixture from the last mentioned system and maintaining the aforesaid systems under substantially the same pressure.

8. A process for the synthetic production of compounds which comprises circulating a gaseous mixture of reactants in each of a plurality of gas circulatory systems in which the gaseous mixture circulating in each system is passed in that system in contact with a synthesis catalyst and then through a product-removal step separate from the circulation of the gaseous mixture in another of said systems first in contact with a synthesis catalyst and then through a product-removal step, continuously and separately introducing fresh reactants accompanied by inert material into each of said systems, continuously withdrawing from one of said systems a portion of the reaction mixture circulated therein, introducing said withdrawn portion into another of said systems and proportioning the amounts of reaction mixture introduced into and withdrawn from said systems to maintain a higher inert content of the reaction mixture in the last mentioned system than in the system from which reaction mixture is introduced thereinto.

9. A process for the synthetic production of ammonia which comprises circulating hydrogen-nitrogen gas in a circulatory synthesis system in which the gas is passed in that system in contact with an ammonia synthesis catalyst and then through an ammonia-removal step, withdrawing from said system a portion of the reaction mixture circulated therein, introducing said withdrawn portion into another synthesis system, passing said portion of reaction mixture in the last mentioned system in contact with an ammonia synthesis catalyst and then through an ammonia-removal step separate from the circulation of gas in the first mentioned system in contact with the ammonia synthesis catalyst and then through an ammonia-removal step and separately introducing fresh hydrogen-nitrogen gas accompanied by inert gases into each of said systems.

10. A process for the synthetic production of ammonia which comprises circulating hydrogen-nitrogen gas in each of a plurality of gas circulatory synthesis systems in which the gas circulating in each system is passed in that system in contact with an ammonia synthesis catalyst and then through an ammonia-removal step separate from the circulation of gas in another of said systems in contact with an ammonia synthesis catalyst and then through an ammonia-removal step, separately introducing fresh hydrogen-nitrogen gas accompanied by inert gases into each of said systems, withdrawing from one of said systems a portion of the reaction mixture circulated therein and introducing said withdrawn portion into another of said systems.

11. A process for the synthetic production of ammonia which comprises circulating a hydrogen-nitrogen gas in each of a plurality of gas circulatory systems in which the gas circulating in each system is passed in that system in contact with an ammonia synthesis catalyst and then through an ammonia-removal step separate from the circulation of the gas in another of said systems in contact with an ammonia synthesis catalyst and then through an ammonia-removal step, separately introducing fresh hydrogen-nitrogen gas accompanied by inert gases into each of said systems, withdrawing from one of said systems a portion of the gas mixture circulated therein, introducing said withdrawn portion into another of said systems, bleeding gas from the last mentioned system and maintaining the aforesaid systems under substantially the same pressure.

12. A process for the synthetic production of ammonia which comprises circulating a hydrogen-nitrogen gas in each of a plurality of gas circulatory systems in which the gas circulating in each system is passed in that system in contact with an ammonia synthesis catalyst and then through an ammonia-removal step separate from the circulation of the gas in another of said systems first in contact with an ammonia synthesis catalyst and then through an ammonia-removal step, continuously and separately introducing fresh hydrogen-nitrogen gas accompanied by inert gases into each of said systems, continuously withdrawing from one of said systems a portion of the gases circulated therein, introducing said withdrawn portion into another of said systems and proportioning the amounts of gases introduced into and withdrawn from said systems to maintain a higher inert content of the reaction gases in the last mentioned system than in the system from which the gases are withdrawn.

13. A process for the synthetic production of ammonia which comprises reacting a mixture of hydrogen and nitrogen in each of a plurality of synthesis systems in each of which the mixture of hydrogen and nitrogen therein is passed in contact with an ammonia synthesis catalyst and then through an ammonia-removal step separate from the passage of the mixture of hydrogen and nitrogen in another of said systems in contact with an ammonia synthesis catalyst and then through an ammonia-removal step, separately introducing fresh hydrogen-nitrogen gas accompanied by inert gases into each of said systems and withdrawing from one of said systems a portion of the hydrogen-nitrogen gas treated therein and introducing said withdrawn portion of gas into another of said systems.

14. The process for the synthetic production of ammonia which comprises reacting a mixture of hydrogen and nitrogen gases containing inerts in a plurality of recirculatory gas units in each of which the gas is passed in contact with an ammonia synthesis catalyst and then through an ammonia-removal step separate from the passage of the gas in another of said units in contact with an ammonia synthesis catalyst and then through an ammonia-removal step, separately introducing into each of said units fresh nitrogen-hydrogen gas carrying inerts and removing inerts from said units by withdrawing portions of the gas circulating in each of said units and introducing into one or more of the units the gas withdrawn from the other units while bleeding from the units into which said portions of gas are introduced a part of the gas circulating therein.

JOHN J. O'LEARY.